(12) United States Patent
Lane (10) Patent No.: US 11,440,613 B2
(45) Date of Patent: Sep. 13, 2022

(54) BICYCLE SUSPENSION

(71) Applicant: Timothy Saul Lane, Irvine, CA (US)

(72) Inventor: Timothy Saul Lane, Irvine, CA (US)

( * ) Notice: Subject to any disclaimer, the term of this patent is extended or adjusted under 35 U.S.C. 154(b) by 91 days.

(21) Appl. No.: 16/886,783

(22) Filed: May 29, 2020

(65) Prior Publication Data

US 2020/0377169 A1    Dec. 3, 2020

Related U.S. Application Data (60) Provisional application No. 62/853,893, filed on May 29, 2019.

(51) Int. Cl.
*B62K 25/28* (2006.01)
*B62K 19/30* (2006.01)

(52) U.S. Cl.
CPC .......... *B62K 25/286* (2013.01); *B62K 19/30* (2013.01)

(58) Field of Classification Search
CPC ...... B62K 25/286; B62K 25/28; B62K 25/30; B62K 25/10
USPC ........................................ 280/284
See application file for complete search history.

(56) References Cited

U.S. PATENT DOCUMENTS

| 723,486 | A | * | 3/1903 | Pierce | B62K 25/286 280/284 |
|---|---|---|---|---|---|
| 5,335,929 | A | | 8/1994 | Takagaki et al. | |
| 5,509,679 | A | | 4/1996 | Leitner | |
| 6,450,521 | B1 | | 9/2002 | Turner | |
| 2008/0217882 | A1 | * | 9/2008 | Beaulieu | B62K 25/28 280/261 |
| 2010/0059965 | A1 | * | 3/2010 | Earle | B62K 25/26 280/284 |
| 2010/0327556 | A1 | * | 12/2010 | Chamberlain | B62K 25/30 280/284 |
| 2014/0015220 | A1 | * | 1/2014 | Talavasek | B62K 3/02 280/275 |
| 2014/0265208 | A1 | | 9/2014 | Voss | |
| 2015/0054250 | A1 | * | 2/2015 | Hu | B62K 25/04 280/276 |
| 2018/0194428 | A1 | | 7/2018 | Hudec | |
| 2019/0039682 | A1 | * | 2/2019 | Zawistowski | B62K 25/30 |
| 2019/0300096 | A1 | | 10/2019 | Chamberlain et al. | |
| 2020/0031426 | A1 | | 1/2020 | Voss | |

OTHER PUBLICATIONS

International Search Report from PCT/US21/32865 dated Aug. 17, 2021.

* cited by examiner

*Primary Examiner* — Jacob D Knutson
*Assistant Examiner* — Abigail R Hymel
(74) *Attorney, Agent, or Firm* — Fox Rothschild, LLP; Kari L. Barnes (57) ABSTRACT

A bicycle rear suspension in which a link extends between a front frame and a rear frame, and a shock absorber between a front frame and a rear frame is provided with a pivot connection and a fixed connection.

19 Claims, 7 Drawing Sheets

BICYCLE SUSPENSION

BACKGROUND

Bicycles may be equipped with suspensions positioned between the frame of the bicycle and the front and/or rear wheels, respectively. Providing suspension on a bicycle potentially improves handling, safety and comfort by absorbing bumps which may be encountered while riding. However, unless properly configured, the provision of suspension may absorb a rider's power, stiffen, soften or otherwise move undesirably during acceleration or deceleration.

Mountain bike rear suspensions, utilizing multiple link members are currently used and are often effective at isolating pedal-induced and brake-induced forces from acting on the rear suspension. However, problems associated with prior rear suspensions involve flex, weight and expense in the bicycle structure due to the multitude of pivots and inefficient support thereof.

SUMMARY

The present disclosure relates generally to bicycle suspension systems, frame assemblies, configurations for rear suspension assemblies and mounting arrangements for rear suspension assemblies.

This disclosure provides a frame which includes a number of interconnected members configured to absorb shocks and impacts associated with operation of the bicycle.

According to some embodiments the suspension system includes a front frame constructed to support a rider, a rear frame constructed to support a rear wheel, a link, and shock absorber configured to move the rear wheel with respect to a front frame.

The rear frame may be configured to connect the locations of a rear wheel axis, a shock absorber connection, and a link connection. A shock absorber can have first and second connections allowing a pivoting movement and fixed connection respectively, said first and second connections may be connected to a front frame and a rear frame respectively, or to a rear frame and a front frame respectively. A link may align a front frame and a rear frame.

BRIEF DESCRIPTION OF THE DRAWINGS

These and other features, aspects and advantages are described below with reference to drawings of embodiments which are intended to illustrate but not to limit the present disclosure.

DETAILED DESCRIPTION OF THE DISCLOSURE

Figure 1:
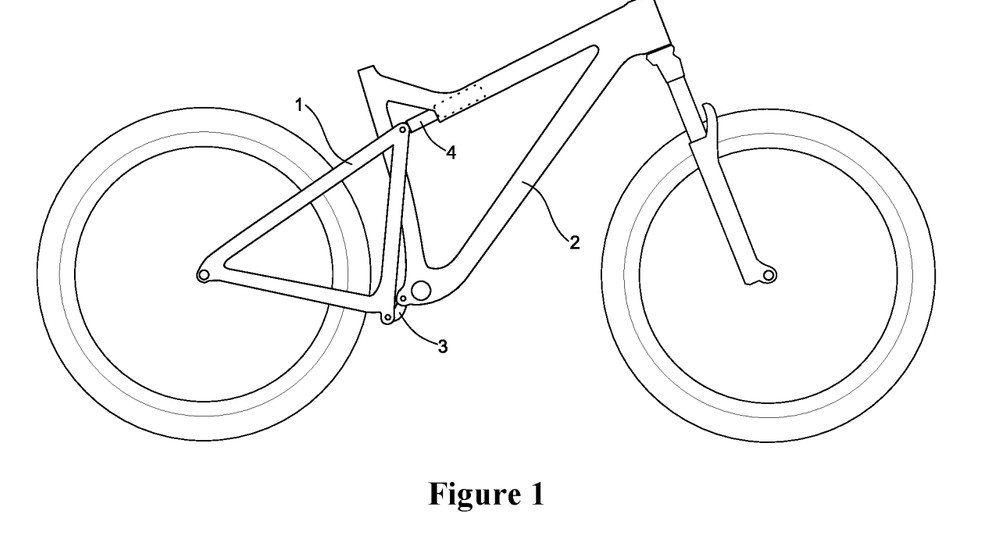
FIG. 1 shows a side view of a preferred embodiment of a bicycle frame of the present disclosure.
Figure 2:
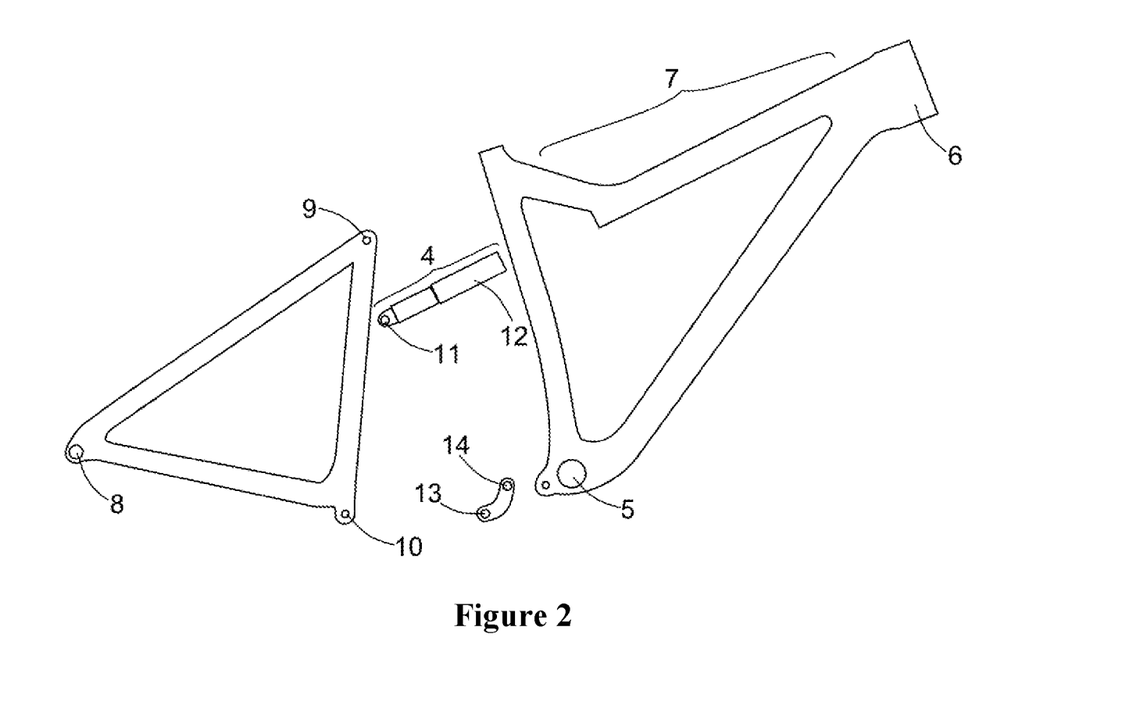
FIG. 2 shows a side view of a bicycle frame of FIG. 1 showing a front frame, rear frame, shock absorber and link in a disassembled state.
Figure 3:
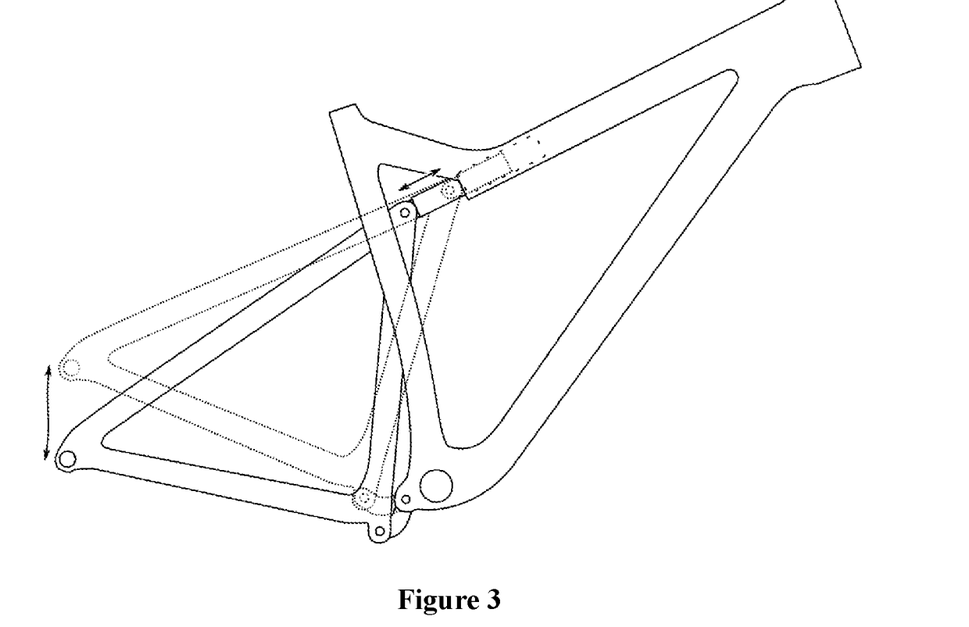
FIG. 3 shows a side view of a bicycle frame of FIG. 1 in an uncompressed state in solid lines and a compressed state in dotted lines.
Figure 4:
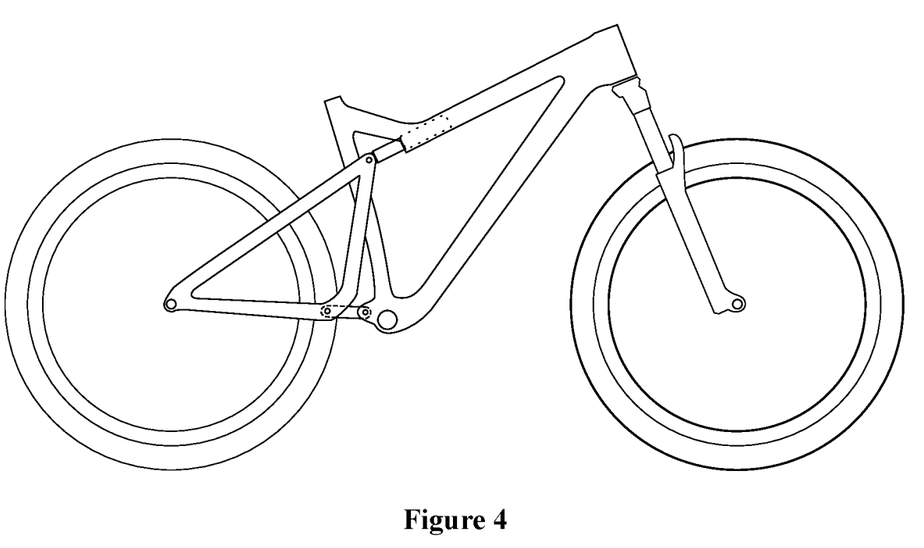
FIG. 4 shows a side view of an embodiment of a bicycle frame of the present disclosure, wherein at least one pivot axis of a link passes through the area within the rear wheel perimeter.
Figure 5:
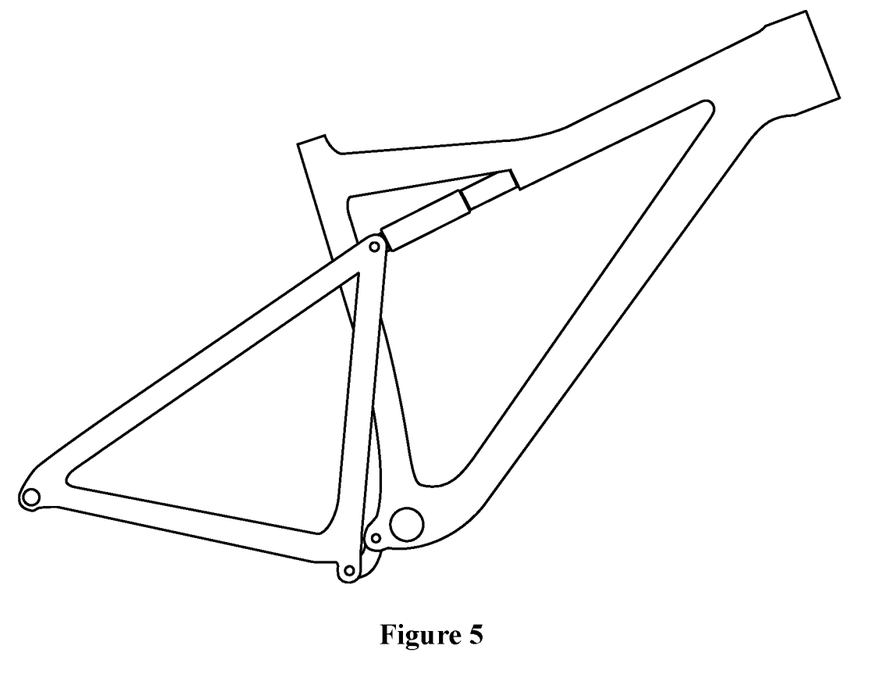
FIG. 5 shows a side view of an embodiment of a bicycle frame of the present disclosure, wherein a shock absorber pivot connection is configured with the outer tube portion of said shock absorber.
Figure 6:
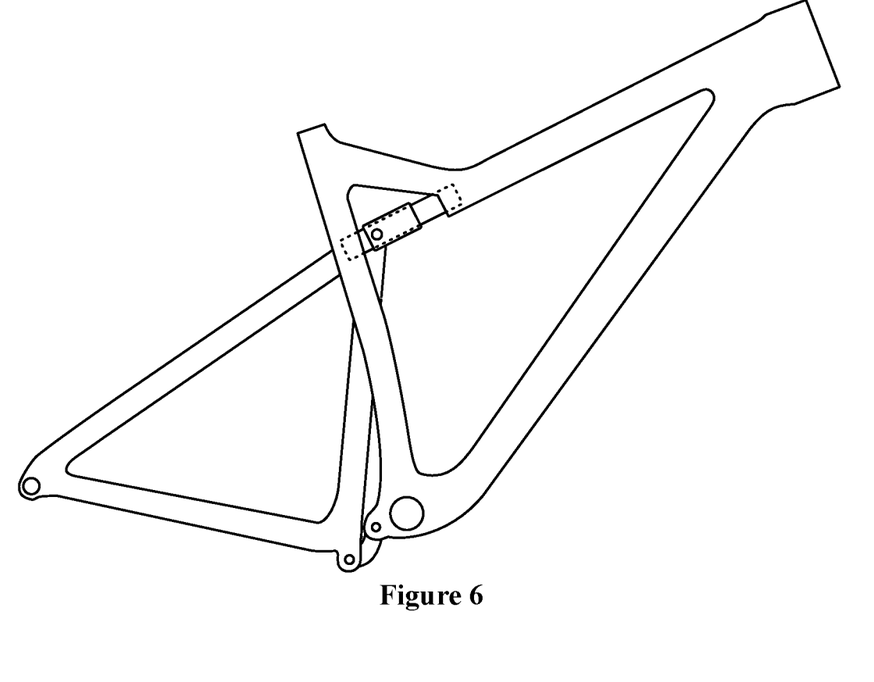
FIG. 6 shows a side view of an embodiment of a bicycle frame of the present disclosure, wherein a shock absorber is configured with multiple connections to a bicycle structure.
Figure 7:
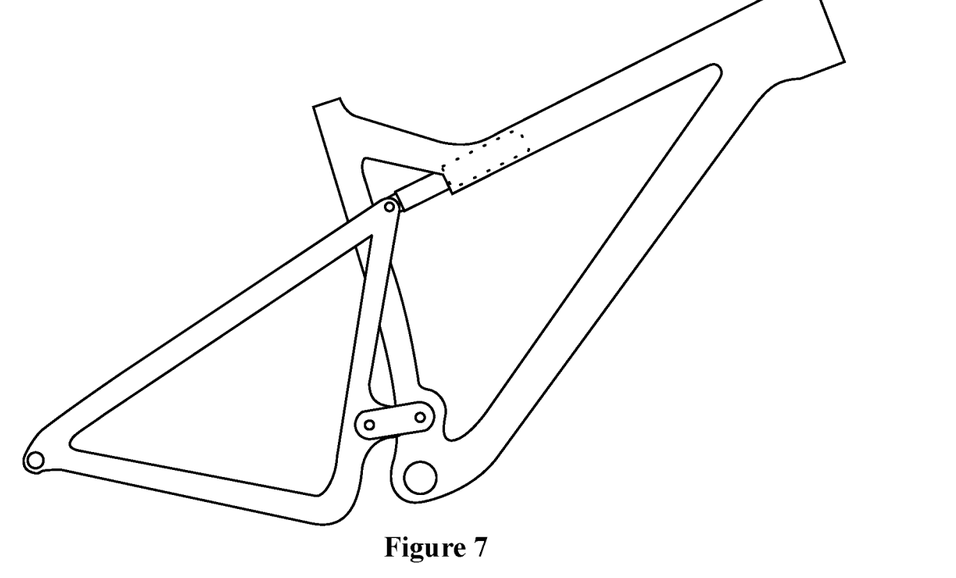
FIG. 7 shows a side view of an embodiment of a bicycle frame of the present disclosure, wherein a link is located above the bottom bracket.
Figure 8:
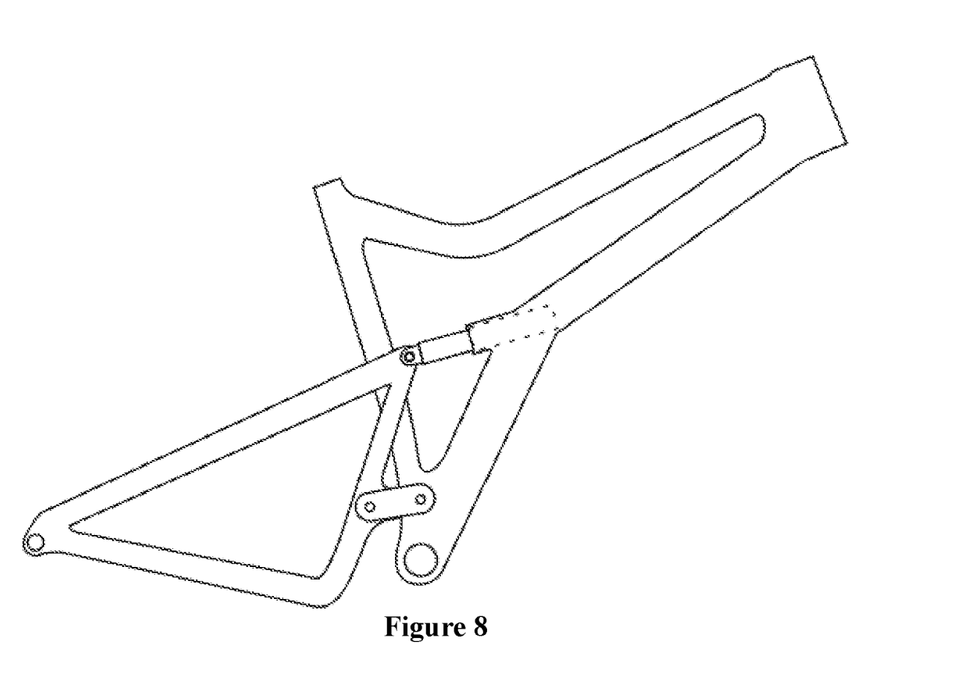
FIG. 8 shows a side view of an embodiment of a bicycle frame of the present disclosure, wherein a shock absorber is configured in the front frame down tube.
Figure 9:
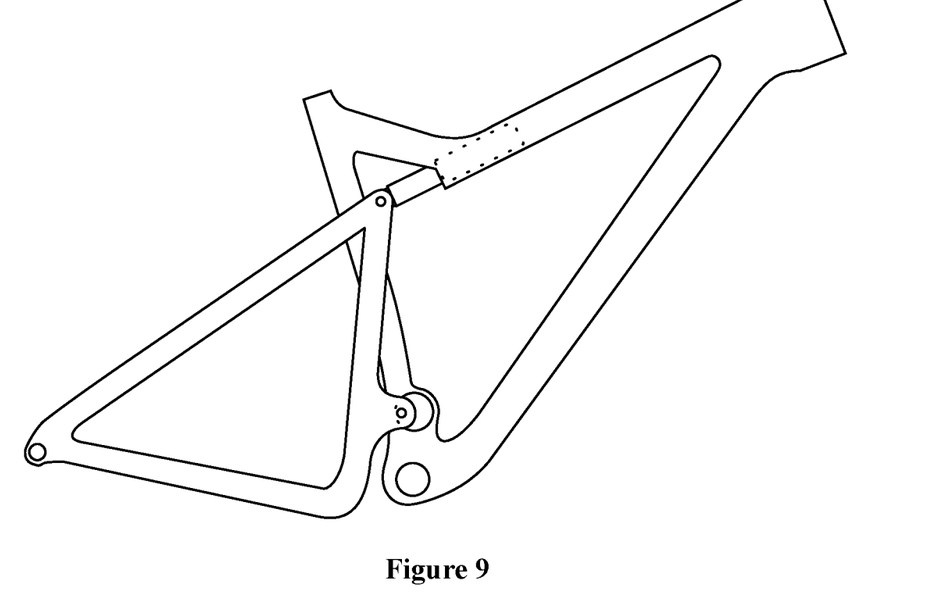
FIG. 9 shows a side view of an embodiment of a bicycle frame of the present disclosure, wherein the link is an eccentric link.
Figure 10:
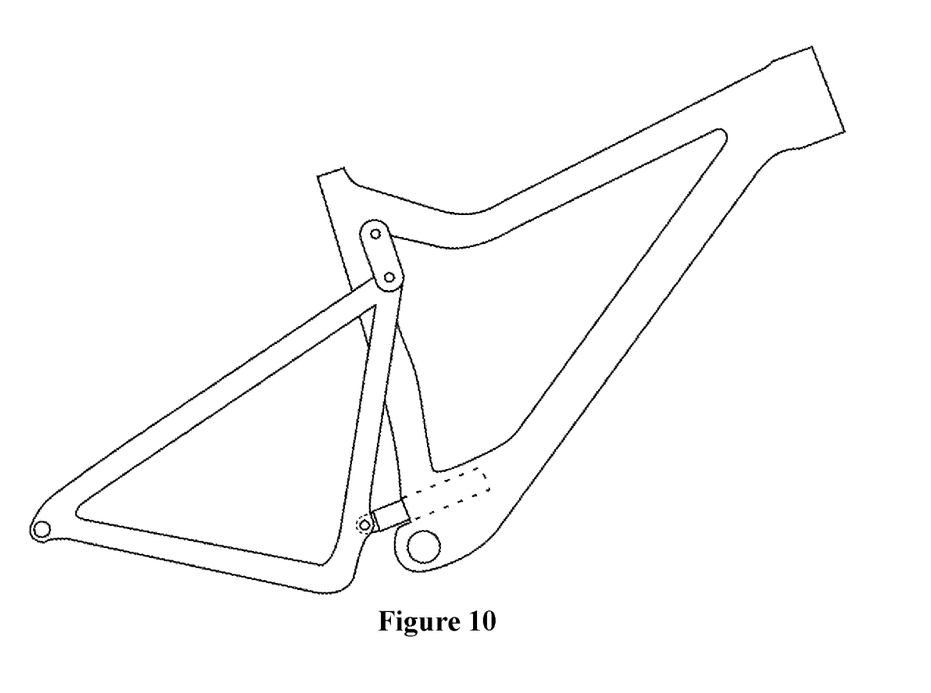
FIG. 10 shows a side view of an embodiment of a bicycle frame of the present disclosure, wherein a shock absorber is located in a position that is generally lower than the link.
Figure 11:
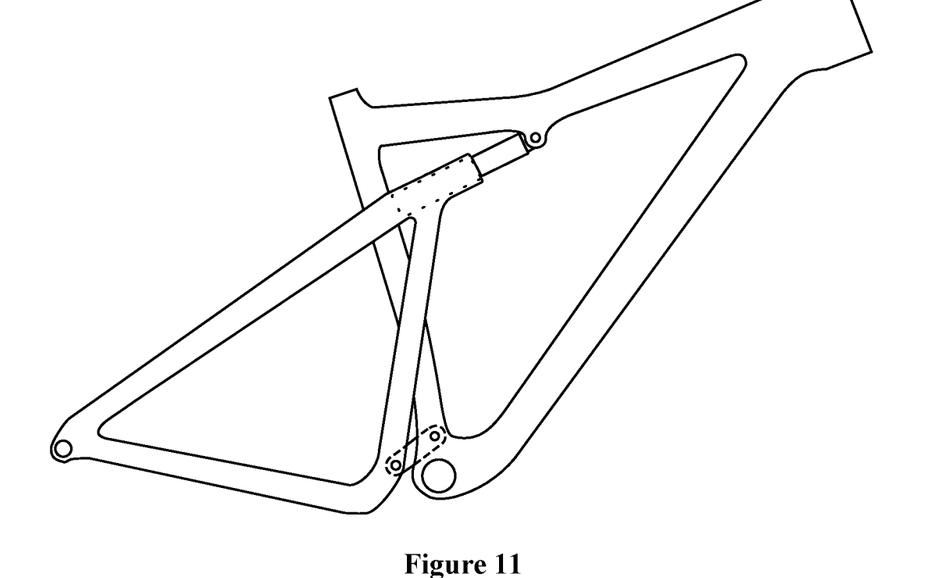
FIG. 11 shows a side view of an embodiment of a bicycle frame of the present disclosure, wherein a shock absorber has a pivot connection to a front frame and a fixed connection to a rear frame.
Figure 12:
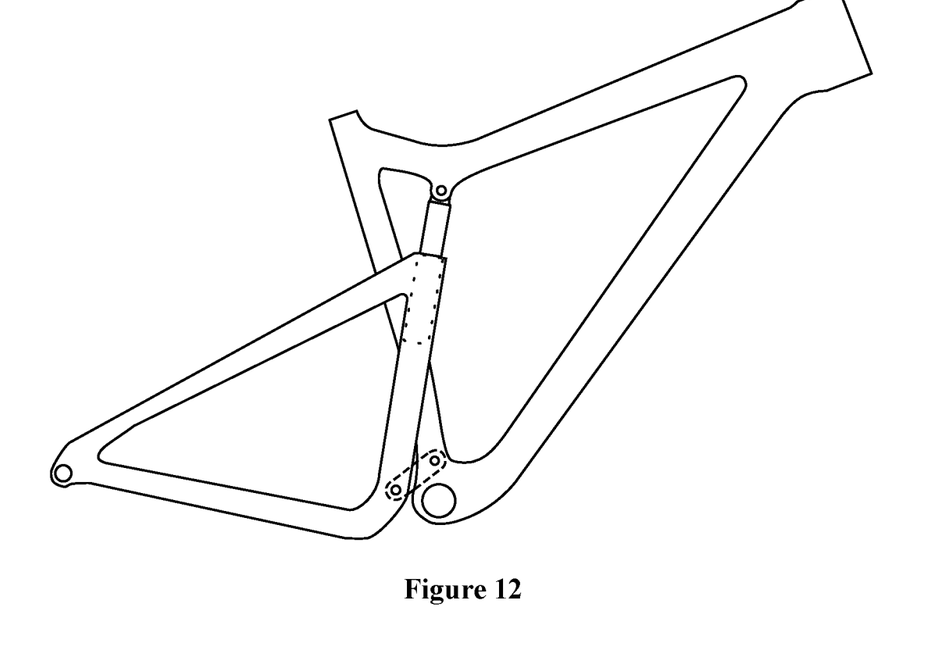
FIG. 12 shows a side view of another embodiment of a bicycle frame of the present disclosure, wherein a shock absorber has a pivot connection to a front frame and a fixed connection to a rear frame.
Figure 13:
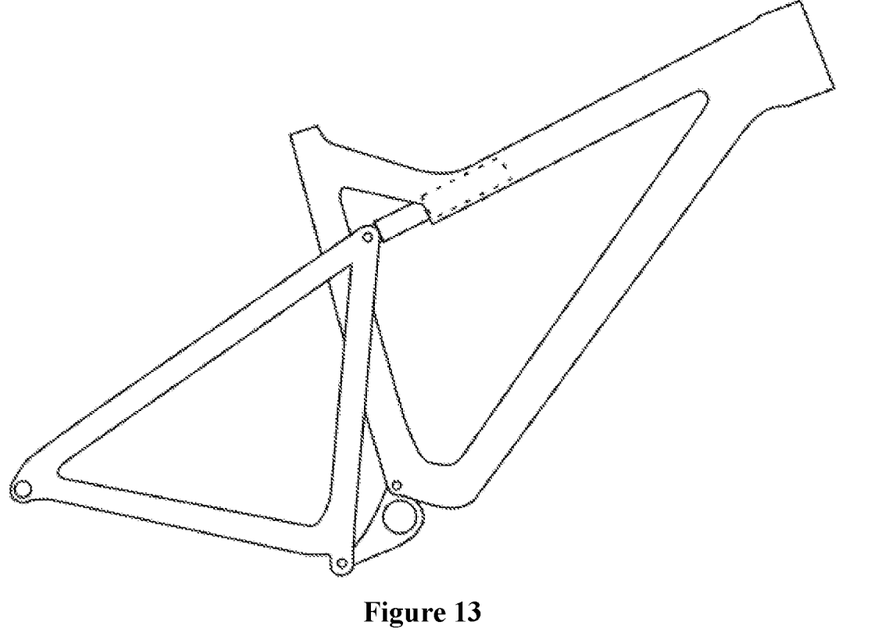
FIG. 13 shows a side view of another embodiment of a bicycle frame of the present disclosure, wherein a link is configured with a bottom bracket.
Figure 14:
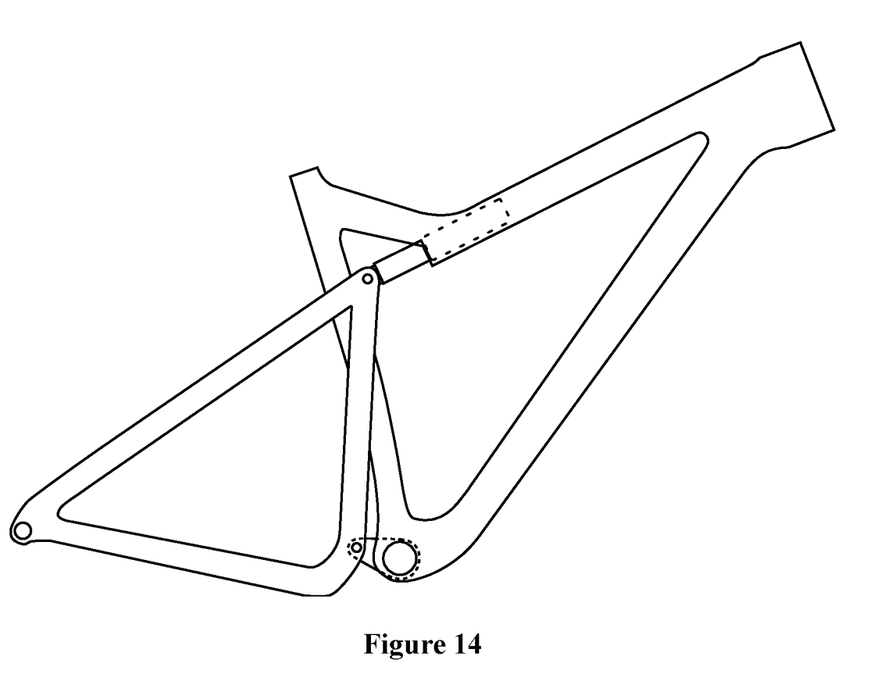
FIG. 14 shows a side view of another embodiment of a bicycle frame of the present disclosure, wherein a link pivots on an axis which is shared with a bottom bracket.

According to some embodiments, a bicycle frame as shown in FIG. 1, FIG. 2, and FIG. 3. may comprise a rear frame (1), configured to move with respect to a front frame (2), a link (3) and a shock absorber (4). The front frame may include a bottom bracket (5), a head tube (6) and structure (7) connecting the bottom bracket and the head tube. The rear frame (1) may be configured to connect the locations of a rear wheel axis (8), a shock absorber connection (9), and a link connection (10). A shock absorber (4) may have first (11) and second (12) connections having a pivoting configuration and a fixed connection respectively, said first connection and second connections may be connected to the front frame and the rear frame respectively, or to the rear frame and the front frame respectively. A link (3) may align the front frame and the rear frame, having first and second pivot axes (13, 14); connected to the front frame and rear frame.

Exemplary embodiments described herein include a bicycle and bicycle suspension. The bicycle suspension may include a front frame 2 coupled to a rear frame 1. The rear frame 1 may be configured to carry a rear wheel axis 8. As illustrated, the rear frame 1 comprises a generally triangular shape in which each apex comprises a connection point. One connection point may be for the rear wheel axis (8), another connection point may be for a shock absorber connection (9), and a third connection point may be for the link connection (10). As illustrated, the front frame may create a general triangular shape. A first apex of the front frame may include a connection point to a link 3 adjacent or concentric with a bottom bracket 5. Another apex of the front frame supports the head tube 6 for connection of the front wheel. A structure at the top of the front frame having one end adjacent or coupled to the head tube 6, may be bent along its length. The front frame may couple to the rear frame at an apex of the front frame and rear frame through a link. The front frame may couple to the rear frame through an apex of the rear frame and along a length of a structure away from the apex of the front frame.

The front frame 2 may be coupled to the rear frame 1 as illustrated. The connection may include two connection locations. A first connection location may be translational along a length of a portion of either the front frame and/or back frame. A second connection location may be rotational, translational, or a combination thereof.

An exemplary first connection may include a combination of rotational and translational connection. As illustrated, the first connection may include a shock absorber 4. The shock absorber 4 may have a first end and a second opposite the first end, such that they define opposing ends. One end may move relative the each other and absorb an impact experienced by the bicycle.

In an exemplary embodiment, the shock absorber may be positioned in the front frame. As illustrated, the front frame 2 may include a beam having a structure 7. The structure may include a linear form in which the shock absorber 4 may be integrated and/or positioned therein. The front frame may then extend out of line defining an elevated portion from the linear length of the structure, to permit the shock absorber to continue the linear extension of the structure. The elevated portion may be angled relative to the structure and/or shock absorber and extend upward out of line from the structure/shock absorber. The shock absorber may therefore define an extension of the structure 7 of the front frame. The shock absorber may permit linear motion along its length as one end may move translationally relative to the other end and the front frame.

In an exemplary embodiment, the opposing end of the shock absorber may couple to the rear frame. The connection between the shock absorber and the rear frame may define a pivotal connection. As illustrated the shock absorber and the rear frame may both include mated apertures such that a pin may be positioned therein and define a pivotal axis.

The opposing ends of the shock absorber may therefore have a fixed connection to the front frame and pivoting connection to the rear frame. The connections may be configured to control movement of the rear frame relative to the front frame.

An exemplary embodiment of the second connection may include a link 3. The link may have a first pivotal connection with the front frame and a second pivotal connection with the rear frame. As illustrated, the link 3 may be curved along a length, but may also be linear, or a combination thereof. The link 3 may therefore include a bend. The shape, whether bending by curvature, linear segments, or a combination thereof, may be generally concave upward toward the shock absorber connection and/or shock absorber. At opposing ends of the link 3, may include apertures for pivotally connecting the link to the front and back frames.

The bicycle suspension may comprise a front frame, a rear frame coupled to the front frame at two connections, a link creating a first connection of the two connections, the first connection defines a pivotal connection between the front frame and the rear frame, and a shock absorber creating a second connection of the two connections. The shock absorber has a first end translationally moveable relative to a second end of the shock absorber. The first end of the shock absorber is fixedly connected to the front frame and the second end of the shock absorber is rotationally connected to the rear frame. Alternatively, the first end of the shock absorber is fixedly connected to the rear frame and the second end of the shock absorber is rotationally connected to the front frame.

The drawings and descriptions are given by way of example and not limitation. Given the above disclosure, one skilled in the art could devise variations that are within the scope and spirit of this disclosure. Further, the various features of the embodiments disclosed herein can be used alone, or in varying combinations with each other and are not intended to be limited to the specific combination described herein. Thus the scope is not to be limited by the illustrated embodiments.

What is claimed is:

1. A bicycle suspension, comprising:
a front frame;
a rear frame coupled to the front frame at two connections;
a link creating a first connection of the two connections, the first connection defines a pivotal connection between the front frame and the rear frame; and
a shock absorber creating a second connection of the two connections, the shock absorber having a first section translationally moveable relative to a second section of the shock absorber, and a first end of the first section is fixedly connected to the front frame and a second end of the second section is rotationally connected to the rear frame.

2. The bicycle suspension of claim 1, wherein the front frame comprises a linear form in which a portion of the shock absorber is positionable therein and extending out of.

3. The bicycle suspension of claim 2, wherein the front frame comprises a structure defining a closed shape in which an angled portion of the front frame extends from the linear form and away from the shock absorber at an end of the linear form in which the shock absorber extends, the angled portion forming an angle relative to the linear form to permit a linear extension and contraction of the shock absorber.

4. The bicycle suspension of claim 1, wherein the front frame defines a closed shape having a first apex of the closed shape adjacent to or comprising a bottom bracket, and a second apex of the closed shape configured to support a head tube for connection to a front wheel, wherein the closed shape is rigid and the first section of the shock absorber is integrated into a portion of a side defining the closed shape to rigidly couple the first section to the front frame.

5. The bicycle suspension of claim 1, wherein the front frame defines a generally triangular shape that has a first apex of the generally triangular shape adjacent to or comprising a pivotal attachment to the link, and a second apex of the generally triangular shape configured to support a head tube for connection to a front wheel, wherein the generally triangular shape is closed and rigid and the first section of the shock absorber forms part of the closed shape of the front frame to rigidly integrate the first section of the shock absorber to the front frame.

6. The bicycle suspension of claim 1, wherein the link has a first end and a second end, the first end pivotally coupled to the front frame and the second end pivotally coupled to the rear frame.

7. The bicycle suspension of claim 1, wherein the link comprises a bottom bracket.

8. The bicycle suspension of claim 1, wherein the front frame comprises a bottom bracket and the link is rotationally coupled to the front frame adjacent to the bottom bracket.

9. The bicycle suspension of claim 1, wherein the front frame comprises a bottom bracket and the link is rotationali coupled to the front frame concentric with the bottom bracket.

10. The bicycle suspension of claim 1, wherein the rear frame comprises a generally triangular shape that has a first apex having a first connection configured to carry a rear wheel having a rear wheel axis, a second apex having a second connection to the shock absorber, and a third apex.

11. The bicycle suspension of claim 10, wherein a third connection to the link is at or adjacent to the third apex.

12. The bicycle suspension of claim 1, wherein the first section of the shock absorber is integrated into the front frame, such that the front frame and the first section of the shock absorber define a rigid structure.

13. A bicycle suspension, comprising:
a front frame having a bottom bracket;
a rear frame coupled to the front frame at two connections;
a link creating a first connection of the two connections, the first connection defines a pivotal connection between the front frame and the rear frame, and the link is rotationally coupled to the front frame adjacent to the bottom bracket; and
a shock absorber creating a second connection of the two connections, the shock absorber having a first section translationally moveable relative to a second section of the shock absorber, and a first end of the first section is fixedly connected to the rear frame and a second end of the second section is rotationally connected to the front frame.

14. The bicycle suspension of claim 13, wherein the rear frame comprises a linear form in which a portion of the shock absorber may be positioned therein and extend out of.

15. The bicycle suspension of claim 13, wherein the front frame defines a generally triangular shape that has a first apex of the generally triangular shape adjacent to or comprising the bottom bracket, and a second apex of the generally triangular shape configured to support a head tube for connection to a front wheel.

16. The bicycle suspension of claim 13, wherein the front frame defines a generally triangular shape that has a first apex of the generally triangular shape adjacent to or comprising a pivotal attachment to the link, and a second apex of the generally triangular shape configured to support a head tube for connection to a front wheel.

17. The bicycle suspension of claim 13, wherein the link has a first end and a second end, the first end pivotally coupled to the front frame and the second end pivotally coupled to the rear frame.

18. The bicycle suspension of claim 13, wherein the rear frame comprises a generally triangular shape that has a first apex having a first connection configured to carry a rear wheel having a rear wheel axis, a second apex having a second connection to the shock absorber, and a third apex.

19. The bicycle suspension of claim 18, wherein the rear frame has a third connection to the link at or adjacent to the third apex.

* * * * *